April 13, 1954    K. S. TYDINGS ET AL    2,674,932
CAMERA ATTACHMENT
Filed Dec. 26, 1947

INVENTORS
Kenneth S. Tydings and
Nathan Rosenthal
By Mark W. Ordway
ATTORNEY.

Patented Apr. 13, 1954

2,674,932

UNITED STATES PATENT OFFICE 2,674,932

CAMERA ATTACHMENT

Kenneth S. Tydings and Nathan Rosenthal, Long Beach, N. Y., assignors to Cameralix, Inc., Brooklyn, N. Y., a corporation of New York Application December 26, 1947, Serial No. 793,970

1 Claim. (Cl. 95—44)

Our invention relates to attachments to cameras of the twin lens reflex type, and has for its object to provide means for correcting parallax and thereby rendering possible the taking of close ups, such as portraits, table top photographs, at distances closer than the camera's normal focusing length. The great problem of overcoming parallax is inherent in any camera in which the viewing lens is not coincident with the taking lens so that without some means for correction, parts of the object to be photographed will not appear on the film.

Hitherto, attempts have been made to solve this problem by employing lenses which are separately turnable, and whose mounting on the camera requires certain experience and skill, by reason of which such cameras cannot be satisfactorily used by a novice.

Simplicity of construction is, therefore, another object of our invention, so that the device can easily and readily be put in position of use, whenever desired, without any previous experience or special skill.

With these objects in view, our invention substantially comprises a pair of auxiliary lenses whose mounts are permanently fixed to one another or made integral parts to constitute a unit and which can be removably applied to the camera in front of its permanent lenses, so as to remain stationary while the camera lenses are being adjusted for focusing. The auxiliary viewing lens of our device is a composite of spherical lens and prism designed to optically correct the parallax and out of focus distortions arising when the camera is moved closer to the object, than the normal focusing length permits, while the taking lens is a simple convex lens of the same focal length as that of the viewing lens.

To make our invention more clear, the same is illustrated in the accompanying drawing, which constitutes part of this specification and in which similar reference numerals denoted corresponding parts.

Figure 1:
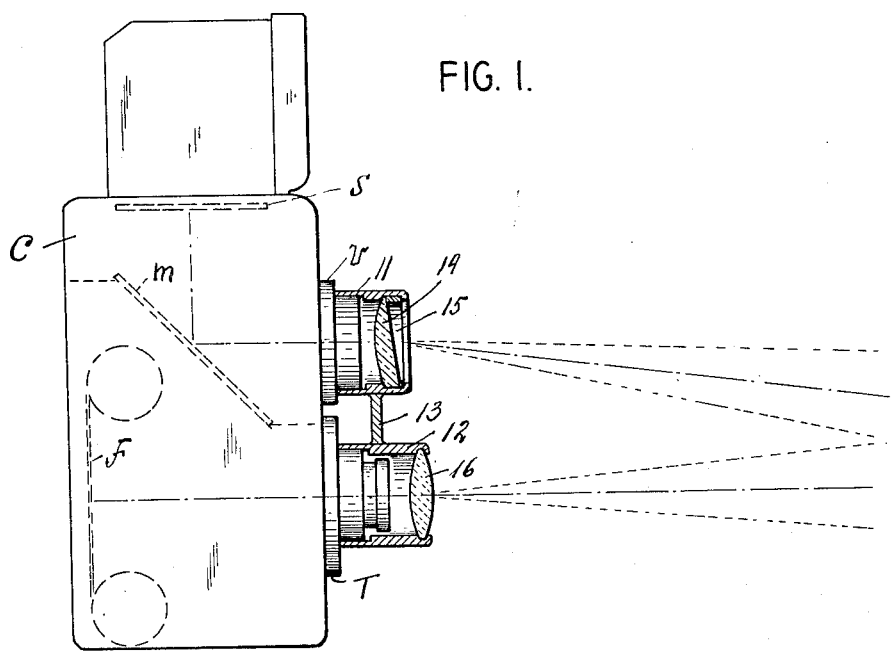
Fig. 1 is a sectional elevation of one embodiment of our device, showing it applied to a twin-lens reflex camera.
Figure 3:
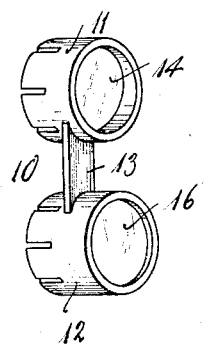
Fig. 3 is a perspective view of the device.
Figure 2:
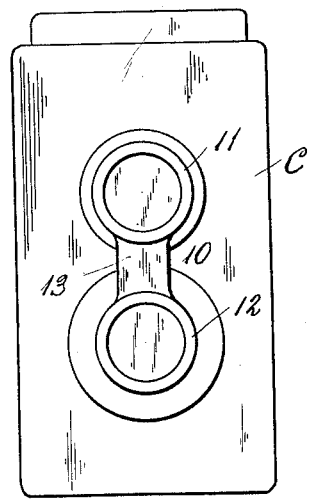
Fig. 2 is a front view thereof.

Referring in detail to the drawing, C denotes a twin-lens reflex type camera of any well known construction, having a viewing lens mount V, a taking lens mount T, the usual mirror M, Film F and the spy view finder S. Our device 10 comprises a pair of auxiliary lens mounts 11, 12, which are permanently fixed to one another by a bar 13 or the like, to constitute a unit. Suitably supported in the upper mount 11 is a composite convex lens 14 and prism 15 and in the lower mount a simple convex lens 16. The prism 15 is ground to the same power as the proper viewing lens requires, to deviate the rays so as to compensate for parallax and to have the proper power for the distance at which the camera is to take the picture. The picture taking lens 16 has the same focal length as the viewing lens.

Thus, according to the distance at which the object is to be photographed, the viewing lens may be ground for 3½ combined with 1 diopter sphere, 7½ combined with 2 diopter sphere, 11 combined with 3 diopter sphere and so on, while the diopter sphere of the lens in the taking mount will always be equal to that of the corresponding viewing lens.

Since with our device the auxiliary lenses always retain the same position when the camera lenses are moved for focusing, a correction of parallax is obtained. Another great advantage of our device, over the same type of cameras hitherto in use, is that with it we are able to get satisfactory close up photography because the viewing lens "sees" exactly and completely the same object "seen" by the taking lens, permitting focusing with the ordinary lenses at any distance from the object. As hitherto constructed, this type of camera can give satisfactory results from infinity only to within 32 inches from the object. If brought closer the viewing lens "sees" a different picture from that "seen" by the taking lens, and parallax results. With our device, the camera can be brought as close as required and sharp focusing is possible even at 9 inches and less. Furthermore, with our device, waste of film can be avoided, since extraneous, undesired background matters are eliminated. Without our device, the undesired parts of the background appearing on the picture have to be cut off and the desired part thereof subsequently enlarged.

The device as a unit can be readily placed in position of use by slipping the mounts 11, 12 over the corresponding mounts V, T of the camera. The taking mount may be provided in its outer periphery with suitable means such as a lip (not shown) to permit the use thereon of a standard sunshade or filter holder.

Various changes may be made in the construction of our device without departing from the principle of our invention.

What we claim is:

In a twin lens photographic reflex camera the combination with its pair of usual viewing and taking lens mounts, of an auxiliary pair of viewing and taking mounts permanently jointed into a unit and adapted to removably fit over said permanent mounts, a composite viewing lens comprising a single convex lens integral with a prism in said auxiliary viewing mount, said prism being ground to the same power required to deviate the rays so as to compensate for parallax; said composite viewing lens having the proper focusing power for the distance at which the image is taken by the camera, and a simple convex lens in said auxiliary taking mount, having the same focusing length as the composite viewing lens.

References Cited in the file of this patent

UNITED STATES PATENTS

| Number | Name | Date |
|---|---|---|
| 1,273,373 | Iwagami | July 23, 1918 |
| 1,295,395 | Wade | Feb. 25, 1919 |
| 1,675,555 | Howell | July 3, 1928 |
| 1,744,788 | Merry | Jan. 28, 1930 |
| 1,854,665 | Parker | Apr. 19, 1932 |
| 1,884,169 | Owens | Oct. 25, 1932 |
| 1,993,463 | Thorner | Mar. 5, 1935 |
| 2,041,633 | Barnack | May 19, 1939 |
| 2,184,015 | McFarlane | Dec. 19, 1939 |
| 2,184,018 | Ort | Dec. 19, 1939 |
| 2,190,718 | Kuppenbender | Feb. 20, 1940 |